Sept. 8, 1964     E. H. LAND ETAL     3,148,058
PROCESS FOR COLOR IMAGE FORMATION
Filed Oct. 17, 1960
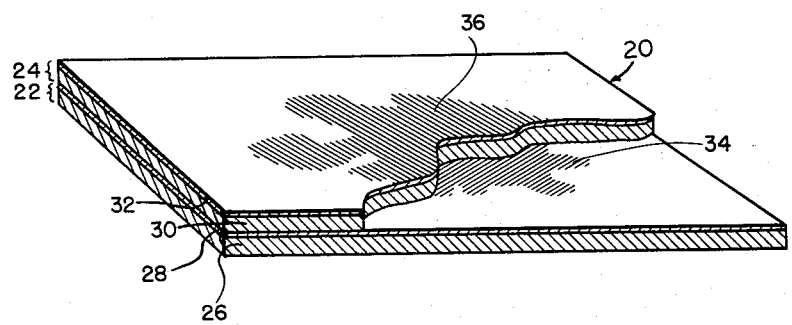
Edwin N. Land
William N. Ryan
Nathan Golk and
Glenn Battaglia
INVENTORS
BY Brown and McKillka
and
Robert J. Schieler
ATTORNEYS

United States Patent Office 3,148,058
Patented Sept. 8, 1964

3,148,058
PROCESS FOR COLOR IMAGE FORMATION
Edwin H. Land, Cambridge, William H. Ryan, Carlisle, Nathan Gold, Newton, and Glenn Battaglia, Lexington, Mass., assignors to Polaroid Corporation, Cambridge, Mass., a corporation of Delaware
Filed Oct. 17, 1960, Ser. No. 63,213
5 Claims. (Cl. 96—2)

This invention relates to the formation of images and more particularly to the formation of composite multicolor images.

Generally the information content of a scene, in terms of color, may be stored as a set of latent images photographically recorded. Reproduction of the color characteristics of the scene results upon processing the latent images into dye images, the colorimetric fidelity of the reproduction depending upon the choice of dye colors employed. The reproduction, as a composite multicolor record, may be formed by methods found on classical tri-stimulus theory or by methods based on bi-stimulus phenomena.

In the former methods, a record of an image is typically produced by photoexposing a tri-pak comprising a red-sensitive stratum, a green-sensitive stratum and a blue-sensitive stratum, and forming respective positives of the image in terms of cyan, magenta and yellow densities. The three positives, in registration, form an integral image which appears multicolored in white light.

In another method, two black-and-white diapositive records of a scene are formed, for instance, one having been made through a green filter and the other through a red filter. One of the diapositives is then projected with light of the color of the corresponding filter through which that diapositive was originally formed, the other diapositive being projected with white light and in register with the projected image of the first diapositive. The composite image produced through the additive synthesis of this bi-stimulus process appears in a full range of color to an observer. The phenomena, although not completely understood, have been described in the prior literature.[1]

In the latter process it is generally desirable to employ special apparatus to obtain acceptable results. For example, the camera used generally includes a beam-splitter, at least one color filter and two adjacent photosensitive plates; the projection apparatus usually comprises, in its simplest embodiment, two projection lenses and a color filter over one of the lenses. While the overall process is simpler in some respects than conventional tri-pack color photography, it requires the production and use of a pair of physically separate records. Additionally, the special apparatus is somewhat more expensive and complex in order to meet the requirement of accurate registration of the projected images with one another.

The present invention contemplates embodying advantages inherent in such a two-color process while profiting from the simplicity and availability of projection devices adapted to use the integral tri-pack record. Additionally, the present invention is useful in the formation of reflection prints in the photographic art, without

[1] Some examples of "Raycol Colour Cinematography," Brit. Jour. of Phot., Colour Supp. XXIV, November 1930, p. 43; A. Cornwall-Clyne, Colour Cinematography, pp. 260–261, Chapman & Hall, 1951; E. Land, "Experiments in Color Vision," Scien. Amer., May 1959, p. 84; F. Bello, "An Astonishing New Theory of Color," Fortune, May 1959, p. 144.

involving the use of so-called screen techniques in the formation of the ultimate composite image.

Consequently, an object of the present invention is to provide, as a novel product, a print which appears in a full range of colors corresponding substantially to the colors of the subject which the print represents. The print, formed by a subtractive synthesis of a pair of photographic records, is adapted for use as a transparency for direct or projected viewing with conventional apparatus or, with the addition of a reflection backing, as a reflection print.

Other objects of this invention are to provide a novel method for forming an integral, composite record having a chromaticity component and a luminance component, the chromaticity component being formed in terms of various densities of a single color or dye, the luminance component being formed in terms of various densities or shades of "black-and-white"; to provide a method for forming a record which appears multicolored when viewed in white light, the record being formed by subtractive synthesis of one continuous image component represented in "black-and-white" densities and another continuous image component represented in densities of a single color.

The term "black-and-white," as used herein, is with reference to representation in densities along a so-called gray scale, i.e., from a very light gray to a very dark gray. Because such a gray scale is never fully black or completely clear (or white), the term "black-and-white" is in a sense inaccurate but is employed herein both for convenience and as words of the art.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings, which is a perspective diagram, partly in cross-section and partly broken-away, showing one embodiment of the product of the present invention.

In this figure, the embodiment is shown in the form of laminated sheet 20 comprising first component sheet element 22 and, juxtaposed therewith, second component sheet element 24. In the embodiment shown, first element 22 includes a suitable base or support layer 26 and processed emulsion layer 28. Second element 24 includes a similar support layer 30 and second processed emulsion layer 32.

First element 22 comprises a record bearing an image 34 of the subject matter sought to be represented. Element 22 may be called the luminance component or record of the invention inasmuch as it supplies, in terms of various densities of "black-and-white," all of the information regarding image brightness. On the other hand, second element 24 comprises a record bearing another image 36 of the subject matter. Element 24 is termed hereinafter the chromaticity component or record. The chromaticity record provides, in terms of the densities of a monochrome dye, color information such that, when combined with the luminance record, a composite image of the subject matter is visually perceptible in a multiplicity of colors. Support layer 30 is preferably transparent, while base 26 may be either transparent or opaque depending upon the use to which sheet 20 is to be put. Where the latter is to be employed as a transparency for direct viewing or as a slide for projection viewing, base 26 is preferably transparent. However, where sheet 20 is to be viewed as a reflection print, base 26 is preferably formed of a material, such as baryta paper, which is opaque and coated to provide diffuse, white reflectivity.

Corresponding portions of each respective image of the records are in spatial congruence or registration with one another, the images being of the same magnitude. The registration of the images is as precise as possible with due allowance being made for distortion introduced by processing, temperature and other record distorting variables. Both images are continuous-tone images in terms of the particular densities of which they are formed.

Generally, in carrying out the process of this invention, a plurality of photosensitive elements are exposed, preferably simultaneously, to radiation emanating from the subject. The elements are so disposed that none interferes with or otherwise obstructs the path or paths of radiation from the subject to the others. A first one of the elements is exposed without any interspersed color filter; the radiation to which at least another or second element is exposed is passed through a color filter disposed between the subject and the second element, thereby predetermining the radiant frequencies, or bands thereof, which are to be recorded on the second element.

The luminance record, in the preferred form, comprises a "black-and-white" positive transparency or diapositive formed from the first element, viz., the element exposed without the filter, and consequently may be originally formed as a direct diapositive. However, where the first element is such that, following exposure, ordinary processing produces a precursor negative, the luminance record or luminance diapositive may be formed from the negative by any of several well-known methods as, for example, diffusion-transfer reversal, direct print out, etc. The first photosensitive element from which such a precursor negative is produced may comprise a standard panchromatic, silver-halide, gelatin-type emulsion film. The terms "negative" and "diapositive" as used herein are intended to refer to photographic elements bearing images respectively negative and positive relative to the subject matter represented and delineated in terms of "black-and-white," i.e., achromatic densities, unless otherwise indicated.

In the several different techniques described hereinafter for carrying out the process of the invention, the luminance record is formed as hereinbefore described. There are, however, several alternative methods by which the chromaticity record may be formed. In one group of processes, the second photosensitive element is exposed through a red color filter and is then processed to form a precursor of the chromaticity record. This group will be termed hereinafter, for the sake of convenience, "red" processes. In yet another group of processes the second photosensitive element, exposed through a green filter, is then processed to form a precursor of the chromaticity record; in similar fashion, this group is termed hereinafter, "green" processes. Yet a third group of processes for forming a chromaticity record requires a pair of photosensitive elements, one exposed through a green filter and the other exposed to the same subject through a red filter, this third group of processes being identified as "balanced" processes. In all of these groups of processes for forming chromaticity record precursors, the precursors may be in the form of either direct diapositives or may comprise a negative from which a diapositive is formed by any of several well-known methods. Thus the photosensitive elements exposed through the color filter or filters, as the case may be, may comprise one of several standard types of "black-and-white" film from which either a diapositive or negative may be produced as known in the art. For the various processes for forming the chromaticity record, the color filters appropriate to the particular process are preferably Wratten No. 24 as the red filter, and Wratten No. 58 as the green filter.

The chromaticity record, bearing an image in terms of a substantially monochromatic density, is produced by one of several masking techniques or methods. For instance, in one method of forming the chromaticity record, a diapositive form of the chromaticity precursor is superposed with a negative of the luminance record such that the images are in register. The total image density of the superposed combination of luminance record negative and chromaticity precursor diapositive is then inverted, for example, by forming a print-through negative of the combination. The density of the image in the print-through negative is then rendered in a single color to produce the final chromaticity record. This is done as by subjecting the print-through negative to a well-known wash-off relief process for forming a monochrome dye transparency of the image. The dye transparency or chromaticity record is then superposed with the luminance record with the images in precise registration, thereby forming a sandwich such as laminated sheet 20 through which white light may be passed and focused by appropriate means in order to form a projected image which appears multicolored.

Several somewhat different techniques may be employed in carrying out the "red" processes of this invention. For instance, one process involves formation of the luminance record as a diapositive directly by exposure of photosensitive material through the subject. The chromaticity precursor is similarly formed, although through an appropriate red color filter, as a direct diapositive also. A negative is then prepared from the luminance record and is superposed with the diapositive or chromaticity precursor, with the respective images in register. A print-through negative is made of the superposed combination. A transparency of the image on the print-through negative, in terms of red, is formed by subjecting the negative, for instance to a known wash-off relief process, thus forming the chromaticity record. The final print is made by sandwiching the chromaticity record with the luminance record.

In another variation of the "red" process, a precursor of the luminance record is formed as a negative from which the luminance record diapositive is then formed. The chromaticity precursor is also formed as a negative from which a corresponding diapositive is made. The latter is then superposed with the luminance precursor negative so that the images are registered, and a print-through negative of the combination is produced. The print-through negative is then treated to render the image in terms of a monchrome red dye, thereby forming the chromaticity record. The final step consists of superposing the chromaticity record, as before, with the luminance record to form the final product.

In still yet another version of the "red" process of the invention the luminance record is formed as a diapositive from a precursor negative, while the chromaticity precursor is formed as a direct disapositive. The chromaticity and luminance precursors are superposed as before and a print-through negative formed therefrom, the latter then being rendered in terms of monochrome dye densities forming the chromaticity precursor, the preferred dye color being red. The two final records are, of course, again superposed in registration to form the sandwich print.

Another technique for carrying out the "red" process involves the formation of the luminance record as a direct diapositive and the formation of the chromaticity precursor as a negative. A print-through negative is then formed of the superposed and registered combination of the luminance record diapositive and the chromaticity precursor negative. The densities of the print-through negative are, however, inverted by forming a diapositive from the print-through negative by any of several well-known methods. The diapositive thus formed is treated, as by a wash-off relief process, to render the image in terms of the preferred red dye, thus forming the chromaticity record which is to be superposed with the luminance record to form the final print.

A specific example of one "red" method for producing one embodiment of sheet 20 is as follows:

A chromaticity record precursor was produced by photoexposing Eastman Kodak Royal Pan film through an Eastman Kodak Wratten No. 24 red filter to form a latent image of a predetermined subject. A similar film emulsion was similarly exposed using no filter under the same physical conditions of lighting, location and distance from the same subject, thereby producing a luminance record precursor. The two emulsions were both developed in a one-to-one mixture of Eastman Kodak Developer DK-50 and water for five minutes at 70° F. to form "black-and-white" negatives the gamma applying to the given film, developer and time being as given on page 49 of "Kodak Films," 7th Edition, contained in the "Kodak Data Book" and published in 1956 by Eastman Kodak Company, Rochester, N.Y., U.S.A. Both negatives were fixed, rinsed and dried. A diapositive was formed on the same type of film by direct print-through from the chromaticity precursor negative and similarly developed, fixed, washed and dried.

The diapositive thus formed was superposed with the luminance record precursor negative, with their respective images in precise registration with one another, to form a sandwich. White light was passed through the sandwich to expose a sheet of Eastman Kodak Matrix film, the exposed film being developed in Eastman Kodak Matrix Developer for two minutes at 68° F., rinsed in water at 68° F. for one-half minute, fixed in Eastman Kodak's Matrix Film Fixer at 68°-70° F. for two minutes, subjected to four 120° F. rinses in water for a total of three minutes, and finally rinsed for one-half minute in 68° F. water and dried.

The resulting "black-and-white" matrix was then bleached out with Eastman Kodak Flexichrome bleach until all silver had been removed and then cleared of bleach by immersion for one minute in Eastman Kodak Acid Fixer maintained at 68° F. The matrix was then dyed for five minutes in Ciba Direct Fast Scarlet 4 SWN dye (manufactured by Ciba Company, Inc., New York, N.Y., and color indexed as Direct Red 24, C.I. No. 29185) in the following solution:

Water (room temperature) _____ cc__ 100
Glacial acetic acid _____ cc__ 3
Dye _____ grams__ 1

The dyed matrix was then rinsed in two separate 3% acetic acid solutions. It being felt that the dye image was somewhat too dense due to a slight overexposure of the matrix film, the final matrix was bleached very slightly in Eastman Kodak's Flexichrome bleach solution to uniformly lighten the image. The final, dyed matrix or chromaticity record was registered on the original "black-and-white" luminance record diapositive and rolled together to form a sandwich such as sheet 20. When projected or viewed by "white" light, an image of the subject appears to exhibit a multiplicity of colors bearing substantial correspondence to the color of the original subject.

As with the "red" processes, several somewhat different techniques may be employed in carrying out the "green" processes for forming the chromaticity record, each of the green processes being somewhat analogous to a corresponding "red" process. In one form of the "green" process, for instance, the chromaticity precursor is formed by photoexposure of a photosensitive element through an appropriate green color filter to produce a negative. The luminance record is superposed with the chromaticity precursor negative so that the respective images are in register. From the superposed combination, a print-through negative is formed and treated to produce a monochrome transparency in terms of a red dye, as by a wash-off relief process, thus forming the chromaticity record. By sandwiching the chromaticity record in registration with the image on the luminance record, the final print is produced.

In yet another example of formation of the chromaticity precursor by a "green" process, the chromaticity precursor is formed by photoexposure of a photosensitive element through an appropriate green color filter to produce a diapositive. A corresponding negative is then formed from the diapositive and superposed with the luminance record so that the images are registered, a print-through negative of the combination being then produced. The print-through negative is then treated to render the image in terms of the preferred red dye, thereby forming the chromaticity record. The last step is complete when the chromaticity record is superposed with the luminance record to form the final product.

It will be seen then that the formation of the appropriate chromaticity records in the "green" process is, in a manner of speaking, the inverse of the corresponding "red" process. For instance, where, in a particular "red" process, the chromaticity record is formed from a positive chromaticity precursor superposed with a luminance record precursor negative as a mask, the analogous "green" process employs a negative chromaticity precursor for superposition with the luminance record precursor negative.

A specific example of one "green" method for producing another embodiment of sheet 20 is as follows:

A luminance record was produced using no filter, by photoexposing a frame of Polaroid PolaPan Land picture roll Type 52, manufactured by Polaroid Corporation, to form a latent image of a predetermined subject. A similar emulsion was exposed through an Eastman Kodak Wratten No. 58 filter under the same physical conditions of lighting, location and distance from the subject. Both emulsions were developed for sixty seconds by the diffusion-transfer reversal process inherent in the picture rolls, thereby forming a pair of diapositives. The diapositive formed by photoexposure through the Wratten No. 58 filter was employed to form a negative by print-through onto Eastman Kodak Super XX film. The latter was tray developed in undiluted Eastman Kodak Developer DK-50 for ten minutes at 68° F. with agitation to obtain a gamma very close to 1. The negative was then placed successively in a stop bath, hypo eliminator, washed and dried, thereby completing the formation of the chromaticity precursor negative. The negative thus formed was superposed with the diapositive formed by photoexposure without a filter, i.e., the luminance record, the respective images of the chromaticity precursor negative and the luminance record being in precise registration with one another. White light was passed through the sandwich thus formed for a period of time sufficient to form an image upon Eastman Kodak matrix film. The exposed matrix film was developed for normal contrast in Eastman Kodak Matrix Developer for two minutes at 68° F., appropriately rinsed, fixed, bleached until the image disappeared, cleared of bleach and washed. The matrix was then dyed for five minutes in Ciba Direct Fast Scarlet 4 SWN dye in the solution hereinbefore described, and rinsed twice in 2% acetic solutions for five minutes. The final dye matrix or chromaticity record was precisely registered with the luminance record and rolled together to form a sandwich such as sheet 20.

In the third or "balanced" group of processes, the formation of the chromaticity record is achieved by a somewhat different route. In one example of the process, three photosensitive elements are initially exposed as follows: the first element is exposed without any interposed filter to form the luminance record as in the previous processes, a second element is exposed through a red filter such as a Wratten No. 24, and a third element is exposed through a green filter such as a Wratten No. 58. The latter two elements are then developed to form real images, one being produced as a diapositive, the other as a negative (the images of both being the same size), and the two are then sandwiched together with their respective images in register. Through the sandwich formed by the superposed registered color separation images, white light is passed to photoexpose a photosensitive element and form a composite image of the images on the sandwich. The element bearing the composite image is then subjected as hereinbefore to red dye treatment to form the chromaticity record which is ultimately superposed with the luminance record to form the final product.

More specifically, in one embodiment of this process the photosensitive element exposed through the red filter is formed as a negative, the other element exposed through the green filter being formed as a diapositive. The two are then sandwiched in registration, and a diapositive is formed therefrom by photoexposure of a photosensitive element to white light passed through the sandwich. The diapositive of the combination is then subjected as hereinbefore to the wash-off relief process and dyed out in red to form the chromaticity record. In another embodiment of the process the red separation element is formed as a positive, the green separation element being formed as a negative. From the registered combined sandwich formed by the two, a negative is prepared and dyed out red to form the chromaticity record.

From an analysis of the foregoing processes it will be seen that the luminance record is primarily a record of relative luminous intensities of various portions of the original scene expressed as variations of achromatic densities of the record. Hence, the usual "black-and-white" diapositive satisfactorily fits this basic definition. However, in the formation of the chromaticity record, the process employs an aspect, such as the negative or inverse form, of the luminance record to mask a chromaticity precursor. Hence, the color balance of the final product or print depends, in this sense, upon the luminance record. The spectral sensitivity curves of most "black-and-white" films do not exactly match the spectral sensitivity curve for the average eye, the departure of the two curves from one another usually being greatest in the blue region. Where the departure is so great as to cause color defects, correction may be accomplished in the formation of the luminance record by exposure initially through a yellow filter, such as a Wratten No. 9.

The chromaticity record comprises an image in monochrome densities. The variations in density, i.e., the contrast, are not a record of differences in luminous intensities of portions of the scene. Instead, contrast in the chromaticity record is a function of the colors of the scene, i.e., the density of the dye image at a particular point provides information which, when combined with the luminance record density at that point, is indicative of the light frequencies apparent at the corresponding point of the original scene. In order to insure that the final chromaticity record most nearly approaches a structure in which the foregoing dependence upon color and independence of intensity is found to a very high degree, the density distribution of common image portions of the luminance record negative and the chromaticity precursor should be the inverse of one another, at least to the extent of the total contrast range.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A process for producing a composite photographic print bearing an image which exhibits substantially the entire spectral color range of a multicolored photographic subject, comprising the steps of exposing a gelatino silver halide emulsion to said subject without a color-separation filter, exposing to said subject through a red filter a gelatino silver halide emulsion which is similar to said first-named emulsion, processing said emulsions to provide, respectively, therefrom a first and a second negative, exposing individually through said negatives a gelatino silver halide emulsion which is similar to said previously-named emulsions and processing said emulsion to provide therefrom, respectively, a first and a second black-and-white positive, superimposing and holding in registered relation said first negative and said second positive to form a composite assembly, exposing to white light through said composite assembly a gelatino silver halide matrix film, developing, fixing, bleaching and again fixing said exposed matrix film to divest it of silver and render it adapted to take up a dye, imbibing a red dye into said matrix film to provide a red-dyed image therein, superimposing in registered relation said red-dyed image of the matrix film and said first black-and-white positive to form said composite photographic print, and directing white light onto said print to render visible therein said image exhibiting said entire spectral color range.

2. A process, as defined in claim 1, wherein said first and second positives are direct positives produced from said emulsion by a conventional reversal method.

3. A process for producing a composite photographic print bearing an image which exhibits substantially the entire spectral color range of a multicolored photographic subject, comprising the steps of exposing a first gelatino silver halide emulsion to said subject without a color-separation filter, exposing to said subject through a green filter a second gelatino silver halide emulsion which is similar to said first-named emulsion, processing said first and second emulsions to provide, respectively, therefrom by diffusion transfer a first and a second black-and-white positive, exposing through said second positive a panchromatic gelatino silver halide emulsion and processing said emulsion to provide therefrom a negative having a gamma of approximately 1, superimposing and holding in registered relation said negative and said first black-and-white positive to form a composite assembly, exposing to white light through said composite assembly a gelatino silver halide matrix film, developing, fixing, bleaching and again fixing said exposed matrix film to divest it of silver and render it adapted to take up a dye, imbibing a red dye into said matrix film to provide a red-dyed image therein, superimposing in registered relation said red-dyed image of the matrix film and said first black-and-white positive to form said composite photographic print, and directing white light onto said print to render visible therein said image exhibiting said entire spectral color range.

4. A process for producing a composite photographic print bearing an image which exhibits substantially the entire spectral color range of a multicolored photographic subject, comprising the steps of exposing a first gelatino silver halide emulsion to said subject without a color-separation filter, processing said emulsion to provide therefrom a first black-and-white positive, exposing to said subject a second gelatino silver halide emulsion through a red filter, processing said second emulsion to provide therefrom a second black-and-white positive, exposing to said subject a third gelatino silver halide emulsion through a green filter, processing said third emulsion to provide therefrom a negative, superimposing and holding in registered relation said second positive and said negative to form a composite assembly, exposing to white light through said compositie assembly a gelatino silver halide matrix film, developing, fixing, bleaching and again fixing said exposed matrix film to divest it of silver and render it adapted to take up a dye, imbibing a red dye into said matrix film to provide a red-dyed image therein, superimposing in registered relation said re-dyed image of the matrix film and said first black-and-white positive to form said composite photographic print, and directing white light onto said print to render visible therein said image exhibiting said entire spectral color range.

5. A process, as defined in claim 4, wherein said second black-and-white positive and said negative are reversed in terms of color-separation identity, said second black-and-white positive being derived from said emulsion exposed through said green filter and said negative being derived from said emulsion exposed through said red filter.

References Cited in the file of this patent

UNITED STATES PATENTS

| 1,461,356 | Kelley | July 10, 1923 |
| 1,505,787 | Kelley | Aug. 19, 1924 |
| 1,585,388 | Ives et al. | May 18, 1926 |
| 1,787,201 | Kelley | Dec. 30, 1930 |
| 3,034,890 | Land | May 15, 1962 |

FOREIGN PATENTS

| 506,581 | Great Britain | May 30, 1941 |